(12) United States Patent
Breider

(10) Patent No.: US 7,184,140 B2
(45) Date of Patent: Feb. 27, 2007

(54) DEVICE FOR OPTICALLY MEASURING BOREHOLES

(75) Inventor: Dominique Breider, Echichens (CH)

(73) Assignee: Robert Bosch GmbH (DE)

( * ) Notice: Subject to any disclaimer, the term of this patent is extended or adjusted under 35 U.S.C. 154(b) by 370 days.

(21) Appl. No.: 10/467,328

(22) PCT Filed: Nov. 28, 2002

(86) PCT No.: PCT/DE02/04367

§ 371 (c)(1),
(2), (4) Date: Jan. 12, 2004

(87) PCT Pub. No.: WO03/050474

PCT Pub. Date: Jun. 19, 2003

(65) Prior Publication Data

US 2004/0105094 A1    Jun. 3, 2004

(30) Foreign Application Priority Data

Dec. 7, 2001 (DE) .......................... 201 19 887 U

(51) Int. Cl.
*G01N 21/00* (2006.01)

(52) U.S. Cl. ................................. 356/237.6

(58) Field of Classification Search .. 356/237.1–237.6, 356/241.1, 625
See application file for complete search history.

(56) References Cited

U.S. PATENT DOCUMENTS

| | | | | |
|---|---|---|---|---|
| 3,698,821 A | * | 10/1972 | Ekstrand | 356/237.6 |
| 4,560,273 A | * | 12/1985 | Ando et al. | 356/237.6 |
| 4,711,579 A | | 12/1987 | Wilkinson | |
| 5,430,296 A | | 7/1995 | Dubrulle | |
| 5,610,710 A | * | 3/1997 | Canfield et al. | 356/237.6 |
| 5,854,675 A | | 12/1998 | Lessing et al. | |
| 6,384,911 B1 | * | 5/2002 | Wang et al. | 356/237.6 |

FOREIGN PATENT DOCUMENTS

| | | |
|---|---|---|
| DE | 196 11 613 A1 | 9/1997 |
| DE | 299 16 577 U1 | 3/2000 |
| EP | 0 031 973 A2 | 7/1981 |
| JP | 10-115512 | 5/1998 |
| JP | 2000-97641 | 7/2000 |

* cited by examiner

*Primary Examiner*—Hoa Q. Pham
(74) *Attorney, Agent, or Firm*—Ronald E. Greigg

(57) ABSTRACT

A device for optically measuring bores in components, preferably injection bores in fuel injection valves, having a light source and an optical measuring instrument for optically detecting the geometry of the bore. The light source illuminates an opal solid body, which rests on the component on the end of the bore opposite the optical measuring instrument.

3 Claims, 2 Drawing Sheets

DEVICE FOR OPTICALLY MEASURING BOREHOLES

CROSS-REFERENCE TO RELATED APPLICATIONS

This application is a 35 USC 371 application of PCT/DE 02/04367 filed on Nov. 28, 2002.

BACKGROUND OF THE INVENTION

1. Field of the Invention

The present invention is directed to an improved device for optically measuring bores.

2. Description of the Prior Art

One device known from German Patent Disclosure DE 196 11 613 A1 has a light source that as homogeneously as possible illuminates one end of the bore embodied in a component. On the opposite end of the bore, there is a camera or other optical recording device.

The known device includes an optical waveguide, which at its tip opens into a conical face. The light that is fed into the optical waveguide from a light source reaches the tip, where it is scattered by the conical face and thereby illuminates the bore, preferably an injection bore of a fuel injection valve, as known for instance from German Patent Disclosure DE 196 18 650 A1. The conical tip of the optical waveguide, for optimal results, must be calibrated to the particular injection bore so that the optical measurement of the injection bore is sufficiently accurate. This effort and expense for calibration makes the measurement vulnerable to error and means increased expense.

SUMMARY AND ADVANTAGES OF THE INVENTION

The device of the invention has the advantage over the prior art that the illumination of the bore is done extremely uniformly, without requiring complicated calibration of the lighting device. The illumination of the bore is effected via an optical solid body, which is illuminated by a light source and rests on the component on one end of the bore. Because of the illuminated solid body, one end of the bore is evenly lighted, so that with an optical device, accurate measurement of the bore can be done from the other end of the bore. With the omission of calibration, the measurement can furthermore be done very quickly and hence economically. With the omission of calibration, the measurement can furthermore be done very quickly and hence economically.

BRIEF DESCRIPTION OF THE DRAWINGS

Other features of the invention will become apparent from the description contained herein below, taken in conjunction with the drawings, in which.

DESCRIPTION OF THE PREFERRED EMBODIMENTS

Figure 1:
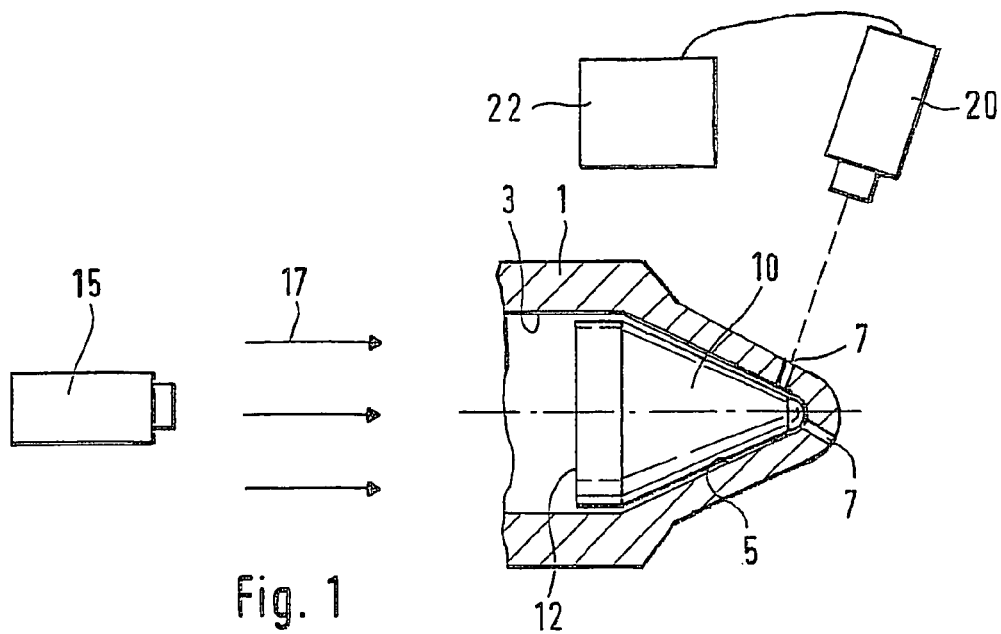
FIG. 1 is a first exemplary embodiment of the device of the invention.

In FIG. 1, one exemplary embodiment of the device of the invention is shown schematically. As an example of a bore to be measured, an injection bore of a fuel injection valve will be used here; the fuel injection valve is shown only in its essential parts, since such fuel injection valves are quite well known from the prior art. In a component, in this case a valve body 1, of a fuel injection valve, there is a central bore 3, which is bounded on one end by a conical valve seat 5. Beginning at the valve seat 5, there are a plurality of bores 7 embodied in the valve body 1; they are embodied here as injection bores 7, and in the installed position of the valve body 1, they connect the valve seat 5 with a combustion chamber of an internal combustion engine. An optical solid body 10, embodied here as a glass body 10, is introduced into the central bore 3. The glass body 10 has a bottom face 12 and a conical outer shape, and at least in the region in which the bore 7 discharges into the valve seat 5, the glass body rests by positive engagement with its conical outer shape on the conical valve seat 5. By means of a light source 15, the glass body 10 is illuminated from its bottom face 12. In FIG. 1, the light source 15 is embodied as a laser or an LED (light emitting diode), which outputs a light 17 with substantially parallel rays of light that strike the bottom face 12. From there, the light is fed into the glass body 10 and illuminates the conical outside, so that the injection bores 7 are also illuminated uniformly. It can be provided here that the conical outside of the glass body 10 is roughened, to create an even more markedly diffuse light. A consistency of the glass body 10 that ranges from diffuse to milky is also suitable, in order to achieve pronounced scattering of the light in the glass body 10.

The measuring of the injection bores 7 is done by means of an optical measuring instrument 20, which can for instance be embodied as a camera 20. Via a control unit 22, the camera 20 is triggered and the pictures taken by the camera 20 are stored in memory. The control unit 22 here also includes an electronic computer, which with the aid of a suitable program, on the basis of the pictures taken by the camera 20, calculates the three-dimensional shape of the injection bore 7.

Figure 2:
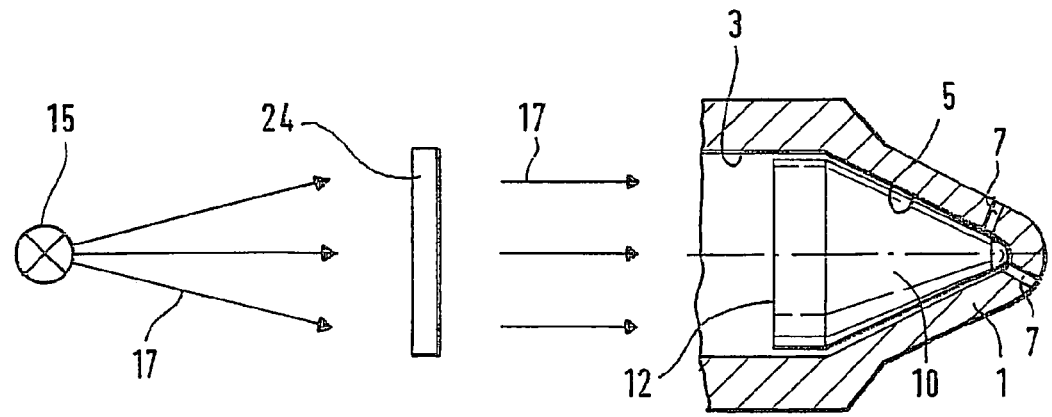
FIG. 2, a further exemplary embodiment, with a different light source.

In FIG. 2, a further exemplary embodiment of the device of the invention is shown. Serving as a light source 15 this time is an electrically operated lamp, which projects non-directional light 17. In order to concentrate the light 17 on the bottom face 12, a lens or lens system 24 is disposed between the light source 15 and the glass body 10 and focuses the light 17 of the light source 15 suitably at the glass body 10. The optical measuring instrument 20 is not shown in FIG. 2, for the sake of simplicity.

Figure 3:
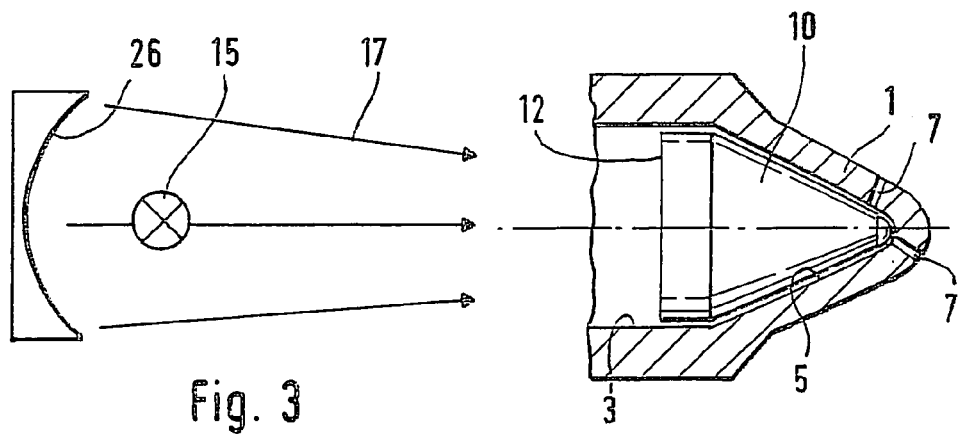
FIG. 3, a further exemplary embodiment with a further light source.

In FIG. 3, a further exemplary embodiment is shown. The light source 15 is once again an electrically operated lamp, but the focusing of the light here is done with the aid of a concave mirror 26.

Figure 4:
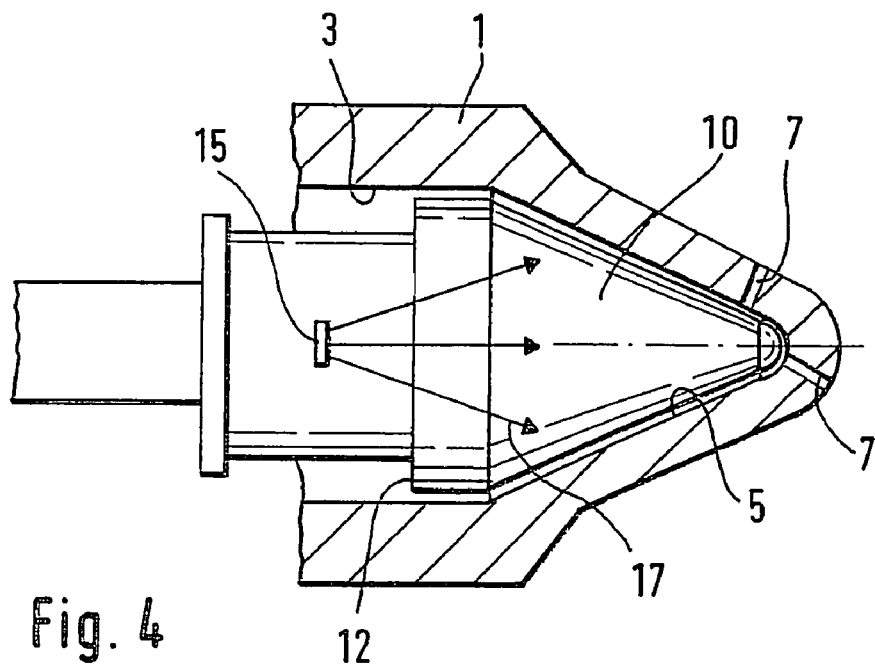
FIG. 4, an exemplary embodiment in which the light source rests directly on the optical solid body.

In FIG. 4, a further exemplary embodiment is shown. Here, the light source 15 is embodied as an optoelectronic light source and is placed directly on the glass body 10. Hence no additional optical elements such as mirrors or lenses are needed. In this case, laser diodes or LEDs are suitable above all.

Figure 5:
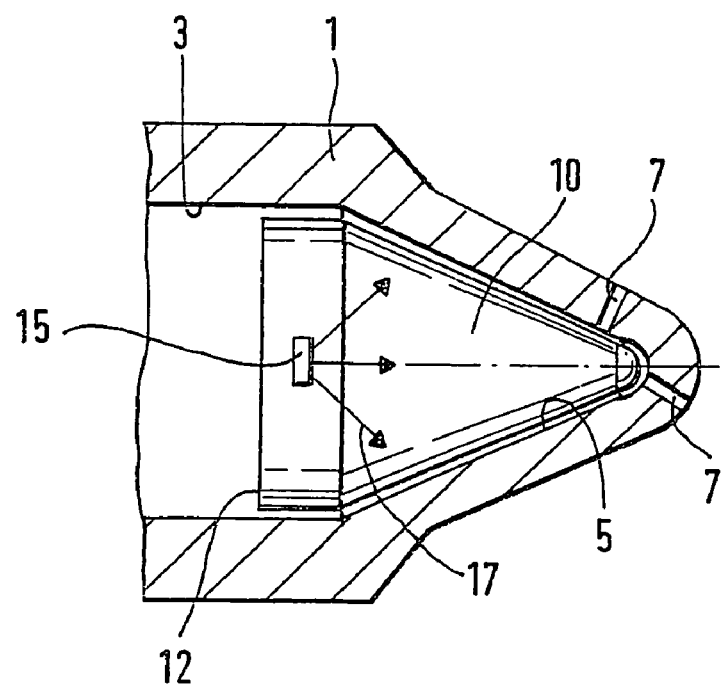
FIG. 5, an exemplary embodiment in which the light source is disposed in the optical solid body.

In FIG. 5, as a further exemplary embodiment, the light source is integrated with the glass body 10, so that aiming the light source or other optical aids are unnecessary.

The optical solid body 10, besides glass (essentially silicon oxide), can also comprise other opal materials.

Materials that can be considered are plastics, such as plexiglass (polymethyl methacrylate), ceramic, or some other diffusing or in other words opal material.

The foregoing relates to preferred exemplary embodiments of the invention, it being understood that other variants and embodiments thereof are possible within the spirit and scope of the invention, the latter being defined by the appended claims.

I claim:

1. A device for optical measurement of bores (7) in components (1), the device comprising
   a light source (15)
   an optical measuring instrument (20) for optically detecting the geometry of the bore (7), and an optical solid body (10) illuminated by the light source (15) and which rests on the component (1) on the end of the bore (7) opposite the optical measuring instrument (20) wherein the component is a valve body (1) of a fuel injection valve, in which beginning at a central bore (3), at least one injection bore (7) is embodied, and wherein the optical body (10) rests on the wall of the central bore(3).

2. The device of claim 1, wherein the injection bores (7) begin at a conical valve seat (5) that defines the central bore (3), and wherein the optical solid body (10) likewise has a conical shape, which rests by positive engagement on the conical valve seat (5).

3. A device for optical measurement of injection bores (7) in fuel injection valves, the device comprising:
   a light source (15)
   an optical measuring instrument (20) for optically detecting the geometry of the bore (7), and
   an optical solid body (10) illuminated by the light source (15) and which rests on the end of the bore of the fuel injection valve opposite the optical measuring instrument (20).

* * * * *